US009449167B2

(12) United States Patent
Varadharajan et al.

(10) Patent No.: US 9,449,167 B2
(45) Date of Patent: Sep. 20, 2016

(54) METHOD AND SYSTEM FOR SECURELY ACCESSING DIFFERENT SERVICES BASED ON SINGLE SIGN ON

(71) Applicant: Infosys Limited, Bangalore (IN)

(72) Inventors: Vijayaraghavan Varadharajan, Salem (IN); Sivakumar Kuppusamy, Coimbatore (IN); Rajarathnam Nallusamy, Thuraiyur Taluk (IN)

(73) Assignee: Infosys Limited, Bangalore (IN)

( * ) Notice: Subject to any disclaimer, the term of this patent is extended or adjusted under 35 U.S.C. 154(b) by 187 days.

(21) Appl. No.: 13/969,404

(22) Filed: Aug. 16, 2013

(65) Prior Publication Data

US 2014/0075202 A1    Mar. 13, 2014

(30) Foreign Application Priority Data

Sep. 12, 2012  (IN) .......................... 3782/CHE/2012

(51) Int. Cl.
| | |
|---|---|
| *G06F 21/41* | (2013.01) |
| *G06F 21/31* | (2013.01) |
| *H04L 29/06* | (2006.01) |
| *G06F 21/34* | (2013.01) |

(52) U.S. Cl.
CPC .............. *G06F 21/41* (2013.01); *G06F 21/31* (2013.01); *G06F 21/34* (2013.01); *H04L 29/06768* (2013.01); *H04L 63/0815* (2013.01)

(58) Field of Classification Search
CPC ... G06F 21/41; G06F 21/31; H04L 63/0815; H04L 29/06768
See application file for complete search history.

(56) References Cited

U.S. PATENT DOCUMENTS

| | | | | |
|---|---|---|---|---|
| 5,271,061 A | * | 12/1993 | Crandall | ................. G06F 7/725 380/28 |
| 7,571,489 B2 | | 8/2009 | Ong et al. | |
| 7,840,993 B2 | | 11/2010 | Ganesan et al. | |
| 8,768,810 B2 | * | 7/2014 | Infanger | ................. G06Q 40/04 705/35 |
| 2002/0095568 A1 | * | 7/2002 | Norris et al. | ................. 713/151 |
| 2003/0012382 A1 | * | 1/2003 | Ferchichi | .............. H04L 63/062 380/270 |
| 2004/0098627 A1 | * | 5/2004 | Larsen | ......................... 713/202 |
| 2005/0201560 A1 | * | 9/2005 | Dube et al. | .................... 380/255 |

(Continued)

OTHER PUBLICATIONS

Kim et al., "Implementation for federated Single Sign-on based on network identity," *Networked Computing (INC), 2010 6th International Conference on Networked Computing.* IEEE, 2010, 3 pages.

(Continued)

*Primary Examiner* — Hadi Armouche
*Assistant Examiner* — Sher A Khan
(74) *Attorney, Agent, or Firm* — Klarquist Sparkman, LLP (57) ABSTRACT

An embodiment for securely accessing services of a service provider based on single sign on. The user device is authenticated by an authentication server if the computed hash of the first random number r is same as the received hash of the first random number r sent by a user device. Thereafter, the second random number y, the user id and an element Q are encrypted using a service provider password and send to the service provider. The user device computes a first discrete exponential function Z using the element Q and the second random number y and sends along with the user id to the service provider. The service provider computes a second discrete exponential function Z' using the element Q and the second random number y received from the authentication server and provides the user device access to the services if Z is equal to Z'.

15 Claims, 5 Drawing Sheets

(56) References Cited

U.S. PATENT DOCUMENTS

| | | | |
|---|---|---|---|
| 2006/0064502 A1* | 3/2006 | Nagarajayya | G06F 21/41 709/237 |
| 2007/0234410 A1* | 10/2007 | Geller | G06F 21/31 726/8 |
| 2008/0059804 A1* | 3/2008 | Shah | G06F 21/41 713/186 |
| 2009/0089266 A1* | 4/2009 | Gollapudi | G06F 17/30693 |
| 2009/0158048 A1* | 6/2009 | Kim | H04L 9/0662 713/184 |
| 2009/0238360 A1* | 9/2009 | Ciet | G06F 7/556 380/28 |
| 2009/0315673 A1* | 12/2009 | Huang | 340/5.61 |
| 2010/0131755 A1* | 5/2010 | Zhu | H04L 63/0815 713/155 |
| 2011/0079386 A1* | 4/2011 | Fripp et al. | 166/249 |
| 2011/0154465 A1* | 6/2011 | Kuzin | H04L 63/0815 726/9 |
| 2011/0225429 A1* | 9/2011 | Papamanthou et al. | 713/189 |
| 2012/0030743 A1* | 2/2012 | Semba | 726/7 |
| 2012/0275601 A1* | 11/2012 | Matsuo | 380/282 |
| 2012/0300930 A1* | 11/2012 | Jutla | H04L 9/0844 380/262 |
| 2012/0311096 A1* | 12/2012 | Hurley et al. | 709/219 |
| 2012/0311330 A1* | 12/2012 | Zhang | H04L 63/0815 713/168 |
| 2013/0156188 A1* | 6/2013 | Xu et al. | 380/255 |
| 2013/0305317 A1* | 11/2013 | Umamaheswaran | H04L 63/0815 726/4 |
| 2014/0040993 A1* | 2/2014 | Lorenzo | G06F 21/41 726/4 |

OTHER PUBLICATIONS

"Passlogy Co., Ltd.: PatternPass 1000," The Tolly Group, No. 208290, Jan. 2009, 4 pages.

Tiwari et al., "Single Sign-on with One Time Password," Internet, 2009. *AH-ICI 2009. First Asian Himalayas International Conference on. IEEE*, 2009, 4 pages.

* cited by examiner

METHOD AND SYSTEM FOR SECURELY ACCESSING DIFFERENT SERVICES BASED ON SINGLE SIGN ON

FIELD

The present disclosure relates to securely accessing different services based on single sign on. In particular, the invention relates to accessing the services based on one way hash and a discrete exponential function.

BACKGROUND

With the increased use of internet, user authentication for accessing different services provided by a service provider has become cumbersome for the user as well as the service provider. For every service, the user is required to remember different passwords and the service provider has to incur cost to maintain all the passwords of user like cost incurred in maintaining large number of IT help desk calls about passwords etc. With single sign-on, users only need to memorize a single password for all the services provided by a service provider. Single sign on is a mechanism that enable the user to access variety of services through only one user id and password without separated process for authentication for different services. There are different types of authentication processes used in single sign on such as enterprise single sign on, web single sign on, Kerberos, Federation identity, OpenID etc.

In Kerberos based single sign on, when a user tries to access protected services of a service provider, the service provider redirects the user to an authentication server. The authentication server generates a Ticket Granting Ticket (TGT) and encrypts it using the user's password and returns the encrypted TGT to the user device. When user wants to access a service, it sends the TGT to a Ticket Granting Service (TGS) that validates the TGT of the user and grants a service granting ticket to the user. The user sends the service granting ticket to the service provider to access the services. The service provider provides the requested services to the user.

One of the drawbacks of using Kerberos authentication process includes compromise of the TGT or the service granting ticket. An unauthorized user can access the services from the account of the authorized user using the compromised TGT or the service granting ticket. This may lead to replay attacks by the unauthorized users.

Therefore, there is a need for a robust single sign on authentication method that is safe from replay attacks.

SUMMARY

The present disclosure discloses an embodiment for securely accessing one or more services based on single sign on. A service request for a service provided by a service provider, a user id and a hash of a first random number r is received from a user device. The hash of the first random number r stored in a database is computed. The user device is authenticated if the computed hash of the first random number r is same as the received hash of the first random number r. After the user device is authenticated, a second random number y is encrypted with the first random number r and sends the encrypted second random number y to the user device. The second random number y, the user id and an element Q are encrypted using a service provider password and sends to the service provider. The user device computes a first discrete exponential function Z using the element Q and the second random number y and sends the user id and the computed first discrete exponential function Z to the service provider. The service provider computes a second discrete exponential function Z' using the element Q and the second random number y. The service provider provides the user device, access to the one or more services provided by the service provider if Z is equal to Z'.

In one embodiment of the present disclosure, the first random number r is generated. Then, the first random number r and the element Q are encrypted with a user password and sends to the user device. The user device decrypts the encrypted first number r and the element Q using the user password and generates a hash of the first random number r.

In yet another embodiment, the user device receives an encrypted first random number r and an element Q from an authentication server. The encrypted first random number r is decrypted and a hash of the first random number r is computed. The user device provide a service request for a service among the one or more services provided by the service provider which a user wants to access, a user id and the hash of a first random number r. An encrypted second random number y is received and decrypted by first random number r. A first discrete exponential function Z using the element Q and the second random number y is computed and sends the first discrete exponential function Z to the service provider.

BRIEF DESCRIPTION OF THE DRAWINGS

FIG. 1 is an illustrative diagram depicting a manner for securely accessing one or more services based on a single sign on.

FIG. 4 is a block diagram illustrating the details of a system for securely accessing different services based on single sign on.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings. While the invention described herein is provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof.

Figure 1:
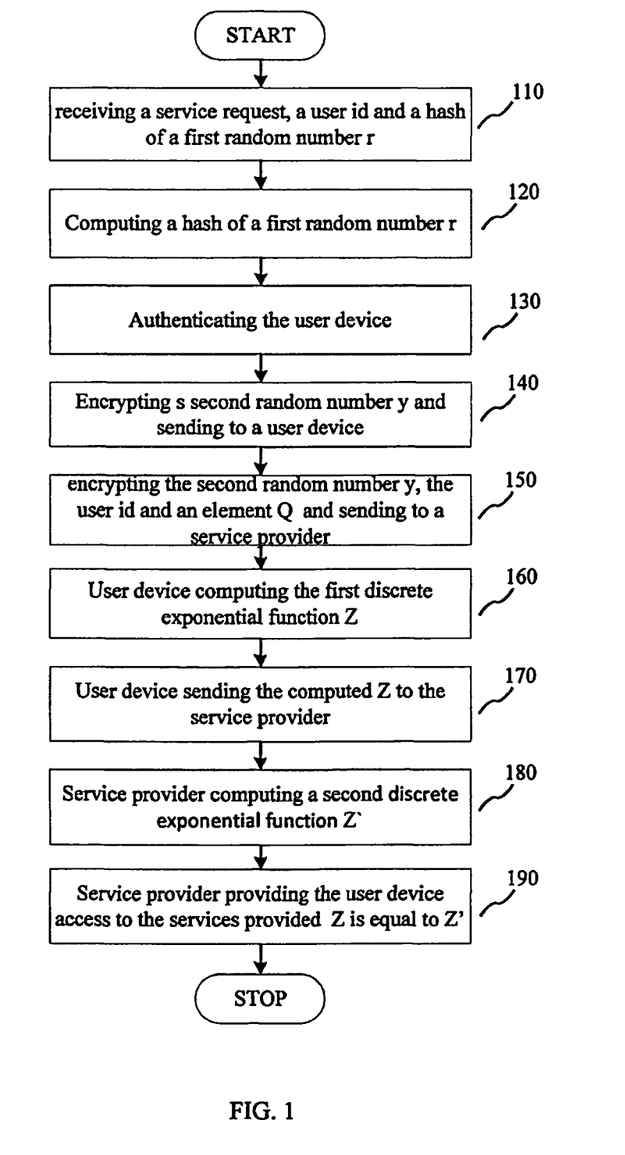

FIG. 1 is an illustrative diagram depicting the manner for securely accessing one or more services based on single sign on. When a user wants to access a service, the user provides a service request for the service, a user id and a hash of a first random number r to an authentication server (step 110). A user id is a unique identifier by which an authentication server identifies the user. A user herein refers to a person trying to access one or more services provided by a service provider. Service request may include an identifier to identify a particular service that user wants to access.

The first random number r may be generated by the authentication server. The first random number may be 56 bit, 64 bit, 128 bit, 160 bit, 192 bit or some other cryptographically strong random number generated by any known function/algorithm. After the first random number is generated by the authentication server, the first random number r is encrypted using the user password. Those skilled in the art will appreciate that any known encryption techniques can be used. The encrypted first random number r is send to the user device. The user device decrypts the encrypted first random number r with the user password provided by the user. The user device calculates the $n^{th}$ time hash of the first random number r and provides the hash to the authentication server.

The authentication server may retrieve first random number r from a database and computes the hash of a first random number r (step 120). The authentication server may compare the value of the computed hash of first random number r and the hash of the first random number received from the user device. If the value of both the hash of the first random number r is same, the authentication server authenticates the user device (step 130).

After the authentication server authenticates the user device, a second random number y is generated and encrypted using the first random number r. The second random number may be 56 bit, 64 bit, 128 bit, 160 bit, 192 bit or some other cryptographically strong random number generated by any known function/algorithm. The encrypted second random number y is send to the user device for enabling the user device to access the services of the service provider (step 140).

Additionally, the authentication server encrypts the second random number y, the user id and an element Q using a service provider password. The element Q is an element from a cyclic group G of generator P. A cyclic group generally refers to a group that can be generated by a single element which is the generator of the group (herein P), such that, every element of the group is a power of P. The encrypted second random number y, user id and element Q are sent to the service provider (step 150). The service provider decrypts the encrypted second random number y, user id and element Q with its password.

When the user wants to access the services of the service provider, the user through the user device computes a first discrete exponential function Z using the element Q and the second random number y (step 160). The user device may receive the element Q encrypted by the user password along with the encrypted first random number r sent by the authentication number. The first discrete exponential function is a one-way function of $h_n(y)$ and Q, where getting $h_n(y)$ from Z is a discrete log problem that is proven hard. The first discrete exponential function Z is computed as:

$$Z = h_n(y) \cdot Q$$

where n is order of hash.

Further, n is decremented by a predefined number if later, the user wants to access the services again thereby, the second time the user device may calculate the discrete exponential function ZZ as:

$$ZZ = h_{n-x}(y) \cdot Q$$

where x is any pre-defined number by which n is decremented. For every subsequent access, the value of n will be further decremented by any pre-defined number till the session of the user with authentication server is active.

Thereafter, the user device sends the user id and the computed first discrete exponential function Z to the service provider (step 170). The service provider computes a second discrete exponential function Z', using the element Q and the second random number y (step 180).

The second discrete exponential function Z' is computed as:

$$Z' = h_n(y) \cdot Q$$

where n is order of hash.

Further, n is decremented by a predefined number if the user wants to access the services again and thereby, the second time the user device may calculate the discrete exponential function ZZ' as:

$$ZZ' = h_{n-x}(y) \cdot Q$$

where x is any pre-defined number by which n is decremented. The pre-defined number may be known to the user device and the service provider as well, Alternatively, the pre-defined number can be send by the authentication server along with the second random number to the user device and the service provider. For every subsequent access, the value of n will be decremented by additional x till the session of the user with authentication server is active.

After computing Z', the service provider compares the value of Z with Z'. If the value matched, the access for the service (as requested by the user) of the service provider is given to the user device (step 190).

Figure 2:
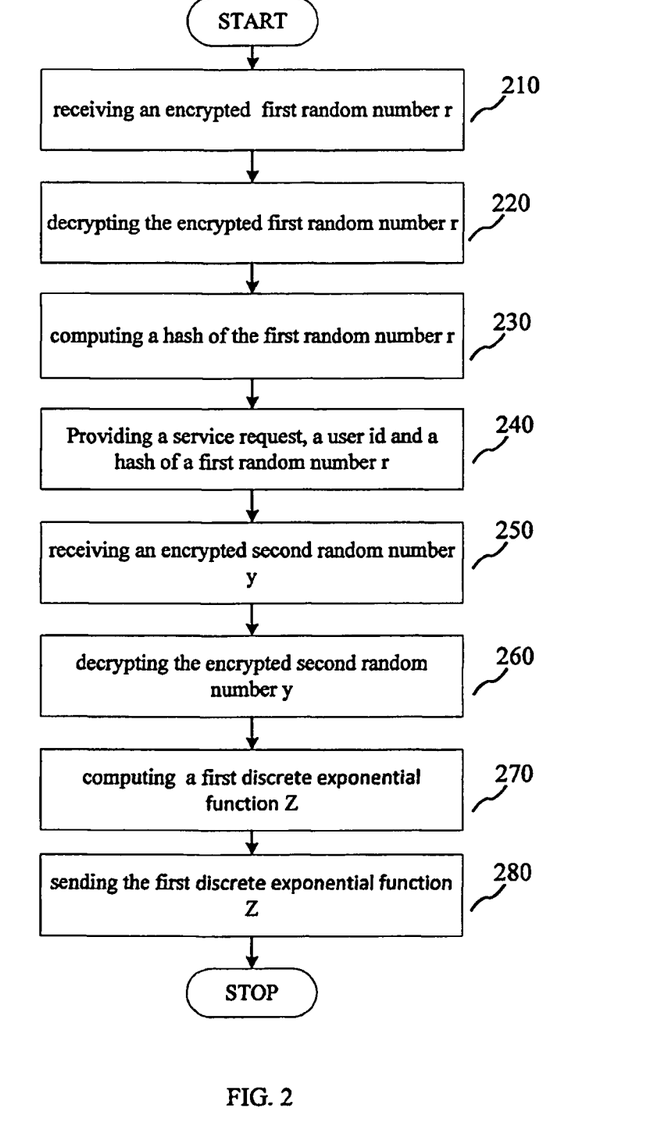
FIG. 2 illustrates a process for securely accessing one or more services provided by a service provider, in accordance with an aspect of the present disclosure.

FIG. 2 illustrates a process for securely accessing one or more services provided by a service provider according to an aspect of the present disclosure. When a user device wants to access the services of a service provider in a single sign on scenario, the user device is required to be authenticated by the authentication server first. A user device sends a user id to an authentication server. Alternatively, the user may send the user id to a service provider and the service provider may redirect it to an authentication server. The user device receives an encrypted first random number r and an element Q from the authentication server (step 210) and decrypts the encrypted first random number r and the element Q using user's password (step 220).

The user device computes a hash of the first random number r (step 230). A service request for a service which a user wants to access and the hash of a first random number are sent to the authentication server for getting authenticated to access the service ticket (step 240). The hash cannot be reused and thereby, this eliminates the replay attack. For the next service request the order of hash of the first random number is reduce by a pre-defined number. This pre-defined number may be known to both the authentication server and the user device. Reducing the order of hash of the first random number by a pre-defined number secures the transaction from hackers as the hash function is one way and the hackers cannot predict hash value used next by the current hash. The authentication server may compute the hash of the first random number r stored in a database and compares the hash received from user device with the calculated hash. If the value of both the hashes is same, the user is authenticated to access the service ticket.

After the user is authenticated, the user device receives an encrypted second random number y (step 250). The user device decrypting the encrypted second random number y using first random number r (step 260). To get the access for the required services, the user device computes a first discrete exponential function Z using an element Q and the second random number y (step 270) and send the first discrete exponential function Z to the service provider whose services the user wants to access (step 280). Thereafter, the service provider computes a second discrete exponential function Z', using the element Q and the second random number y. If the value of Z is same as Z', the access to the services are given to the user device.

Figure 3:
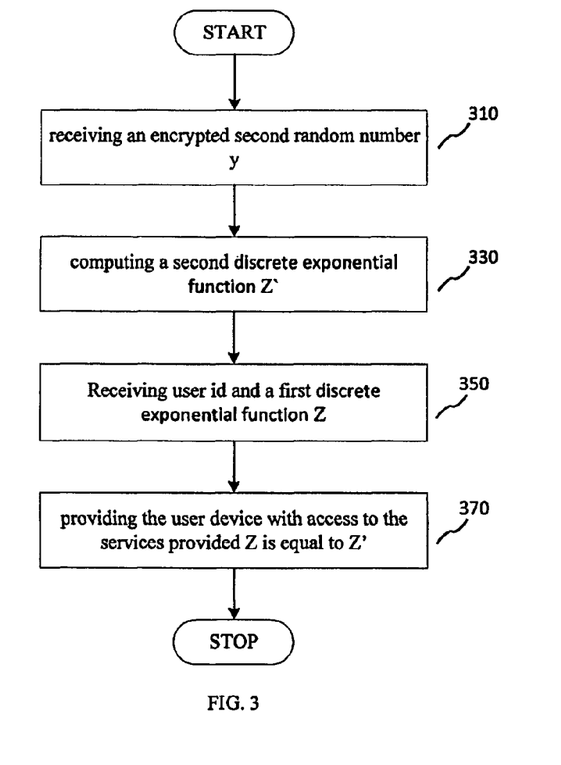
FIG. 3 illustrates a process for securely giving access for one or more services to a user device according to an aspect of the present disclosure.

FIG. 3 illustrates a process for securely giving access for one or more services to a user device according to an aspect of the present disclosure. After the user device gets authenticated by the authentication server, the user needs to get access for the services from the service provider. Accordingly, the service provider receives an encrypted second random number y, a user id and an element Q from the authentication server (step 310). Thereafter, the service provider computes a second discrete exponential function Z', using the element Q and the second random number y (step 330). Further, it receives a user id and a first discrete exponential function Z from the user device (step 350). The service provider checks the values of Z and Z' and the access to the services may be provided to the user if Z is same as Z' (step 370).

Figure 4:
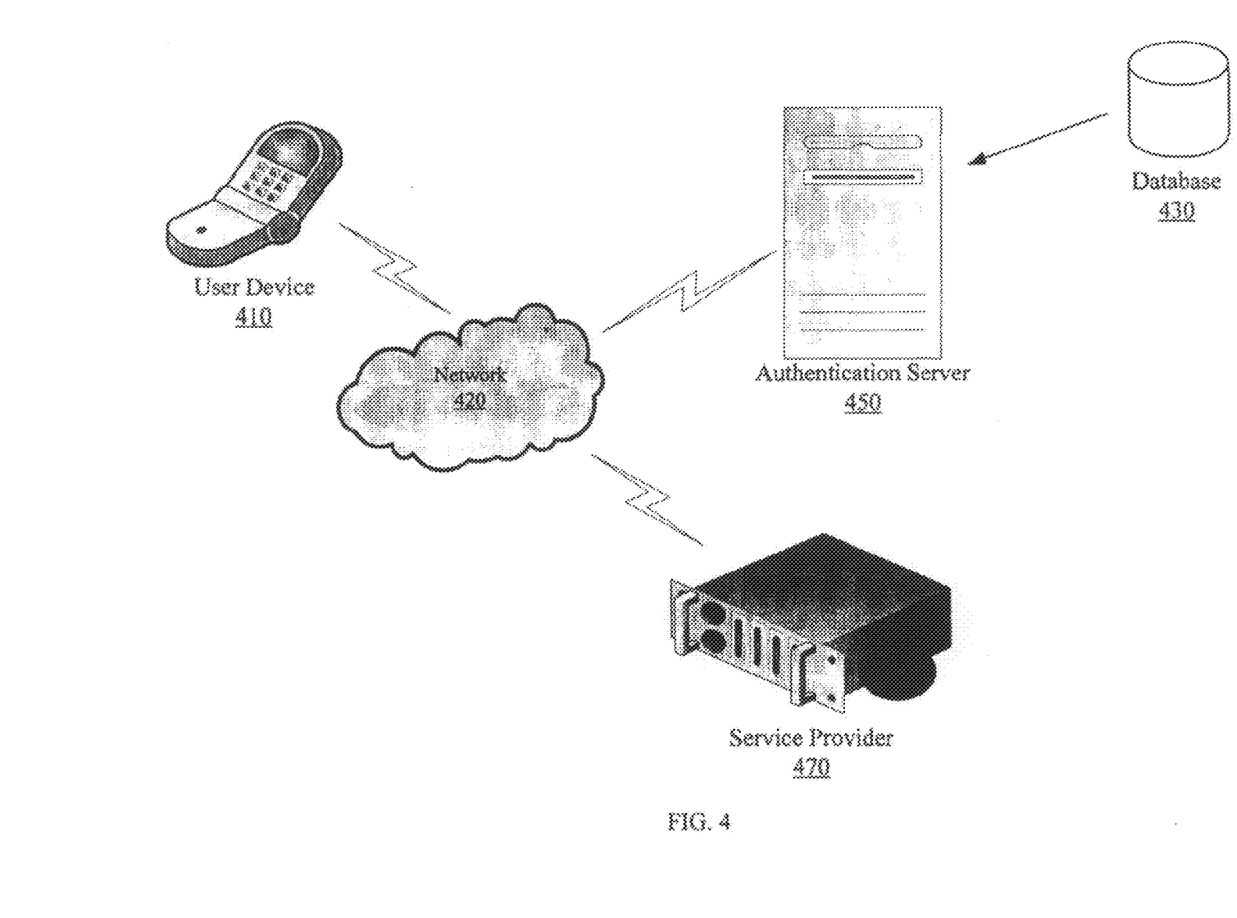

FIG. 4 is a block diagram illustrating the details of a system for securely accessing different services based on single sign on. The system comprises user device 410, network 420, authentication server 450, database 430 and a service provider 470. User device 410 may refer to a phone, Portable Digital Assistance (PDA), pager, Personal Computer (PC), laptop, or tablet, or any other similar device. User device 410 may be connected with authentication server 450 via a data network 420 such as, for example, a Local Area Network (LAN), Wireless Local Area Network (WLAN), Metropolitan Area Network (MAN), and/or Wide Area Network (WAN). Further, authentication server 450 is connected with service provider 470 via network 420 for the purpose of providing user credentials to the service provider 470.

To access services provided by service provider 470, user device 410 provides a service request for services which the user wants to access, a user id and a hash of a first random number r to authentication server 450. Authentication server 450 computes the hash of a first random number r stored in database 430. Authentication device 450 authenticates the user device, provided the computed hash of the first random number r is same as the received hash of the first random number r. After the user is authenticated, authentication server 450 generates a second random number y and encrypts the second random number y with the first random number r. The encrypted second random number y is send to user device 410. User device 410 computes a first discrete exponential function Z using an element Q and a second random number y. The element Q may be provided by the authentication server along with the first random number r or with the second random number y. After computing Z, user device 410 sends the user id and the computed first discrete exponential function Z to service provider 470.

Additionally, authentication server 450 encrypts the second random number y, the user id and the element Q using a service provider password and sends the encrypted second random number y, the user id and the element Q to service provider 470. Thereafter, service provider 470 computes a second discrete exponential function Z' using the element Q and the second random number Y. Service provider 470 provides user device 410, access to the services, provided Z is equal to Z'.

Additional Features

A17. An authentication server comprising:
one or more processors operatively coupled to a memory, the processor configured to perform the steps of:
computing a hash of a first random number r;
receiving the hash of the first random number r;
authenticating a user device, provided the computed hash of the first random number r is same as the received hash of the first random number r;
encrypting a second random number y with the first random number r;
sending the second random number y encrypted with the first random number r to the user device;
encrypting the second random number y, the user id and the element Q using a service provider password; and
sending the second random number y, the user id and the element Q encrypted with the service provider password to the service provider; and
the memory configured to:
store the first random number r, the second random number y and the service provider password.

A18. The authentication server of claim A17, wherein the first discrete exponential function Z is computed as:

$$Z = h_n(y) \cdot Q$$

wherein n is order of hash and n is decremented by a predefined number with each subsequent calculation of Z.

A19. The authentication server of claim A17, wherein the second discrete exponential function Z' is computed as:

$$Z' = h_n(y) \cdot Q$$

wherein n is order of hash and n is decremented by a predefined number with each subsequent calculation of Z'.

A20. The authentication server of claim A17, wherein the element Q is an element from a cyclic group G of generator P.

A21. A computer program product comprising a non-transitory computer readable medium comprising computer readable program code embodied therein for performing a method of securely accessing one or more services based on a single sign on, the method comprising:
receiving, from a user device, a service request for a service among the one or more services provided by a service provider, a user id and a hash of a first random number r;
computing the hash of the first random number r stored in a database;
authenticating the user device, provided the computed hash of the first random number r is equal to the received hash of the first random number r;
encrypting a second random number y with the first random number r;
sending the second random number y encrypted with the first random number r to the user device;
encrypting the second random number y, the user id and an element Q using a service provider password;
sending the second random number y, the user id and the element Q encrypted with the service provider password to the service provider;
computing, by the user device, a first discrete exponential function Z using the element Q and the second random number y;
sending, by the user device, the user id and the computed first discrete exponential function Z to the service provider;
computing, by the service provider, a second discrete exponential function Z', using the element Q and the second random number y; and providing the user device access to the one or more services provided by the service provider, provided Z is equal to Z'.

A22. The product of claim A21, wherein the first discrete exponential function Z is computed as:

$$Z = h_n(y) \cdot Q$$

wherein n is order of hash and n is decremented by a predefined number with each subsequent calculation of Z.

A23. The product of claim A21, wherein the second discrete exponential function Z' is computed as:

$$Z' = h_n(y) \cdot Q$$

wherein n is order of hash and n is decremented by a predefined number with each subsequent calculation of Z'.

A24. The product of claim A21, wherein the element Q is an element from a cyclic group G of generator P.

A25. The product of claim A21, further comprising:
generating the first random number r;
encrypting the first random number r and the element Q with a user password;
sending the encrypted first random number r and the element Q;
decrypting, by the user device, the encrypted first number r and the element Q; and
generating, by the user device, hash of the first random number r.

A26. A computer program product comprising a non-transitory computer readable medium comprising computer readable program code embodied therein for securely accessing one or more services provided by a service provider, the method comprising:
receiving an encrypted first random number r and an element Q from an authentication server;
decrypting the encrypted first random number r;
computing a hash of the first random number r;
providing a service request for a service among the one or more services provided by the service provider which a user wants to access, a user id and the hash of a first random number r;
receiving a second random number y encrypted by the first random number r;
decrypting the encrypted second random number y by the first random number r;
computing a first discrete exponential function Z using the element Q and the second random number y; and
sending the first discrete exponential function Z to the service provider.

A27. The product of claim A26, wherein the element Q is an element from a cyclic group G of generator P.

A28. The product of claim A26, wherein the first discrete exponential function Z is computed as:

$$Z = h_n(y) \cdot Q$$

wherein n is order of hash and n is decremented by a predefined number with each subsequent calculation of Z.

A29. A computer program product comprising a non-transitory computer readable medium comprising computer readable program code embodied therein for securely giving access for one or more services to a user device, the method comprising:
receiving, from an authentication server, an encrypted second random number y, a user id and an element Q;
computing a second discrete exponential function Z', using the element Q and the second random number y;
receiving, from the user device, the user id and a first discrete exponential function Z; and
providing the user device access to the one or more services, provided Z is equal to Z'.

A30. The product of claim A29, wherein the first discrete exponential function Z is computed as:

$$Z = h_n(y) \cdot Q$$

wherein n is order of hash and n is decremented by a predefined number with each subsequent calculation of Z.

A31. The product of claim A29, wherein the second discrete exponential function Z' is computed as:

$$Z' = h_n(y) \cdot Q$$

wherein n is order of hash and n is decremented by a predefined number with each subsequent calculation of Z'.

A32. The product of claim A29, wherein the element Q is an element from a cyclic group G of generator P.

Exemplary Computing Environment

Figure 5:
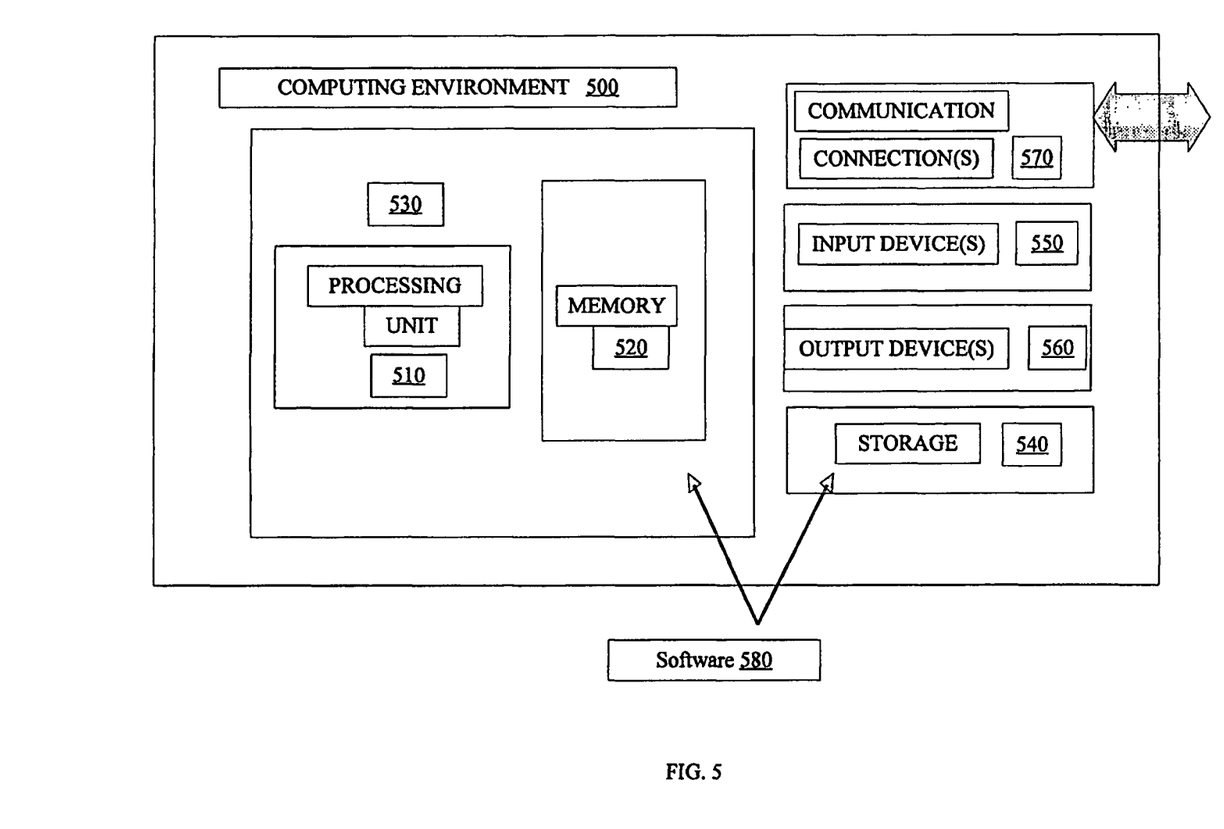
FIG. 5 is a system illustrating a generalized computer network arrangement, in one embodiment of the present technique.

One or more of the above-described techniques may be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which may be used to store information and which may be accessed within the computing environment 500. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A computer implemented method executed by one or more computing devices for securely accessing one or more online services based on a single sign on, the method comprising:

receiving at an authentication server, from a user device, a service request for a service among the one or more online services provided by a service provider server, a user id and a first hash of a first random number r;

retrieving, by the authentication server, the first random number r from a database and computing a second hash of the first random number r;

determining, by the authentication server, that the received first hash of the first random number is equal to the computed second hash of the first random number;

authenticating the user device at the authentication server responsive to the determining that the second hash of the first random number r is equal to the received first hash of the first random number r;

encrypting, by the authentication server, a second random number y with the first random number r;

sending the second random number y encrypted with the first random number r from the authentication server to the user device;

retrieving, by the authentication server, a service provider password, provided by the service provider server, from the database;

encrypting, at the authentication server, the second random number y, the user id, and an element Q using the service provider password;

sending the second random number y, the user id, and the element Q encrypted with the service provider password from the authentication server to the service provider server;

computing, by the user device, a first discrete exponential function Z using the element Q and the second random number y, wherein the first discrete exponential function Z is computed as:

$$Z = h_n(y) \cdot Q$$

wherein n is decremented for subsequent calculations of Z;

sending, by the user device, the user id and the computed first discrete exponential function Z to the service provider server;

computing, by the service provider server, a second discrete exponential function Z', using the element Q and the second random number y, wherein the second discrete exponential function Z' is computed as:

$$Z' = h_n(y) \cdot Q$$

wherein n is decremented for subsequent calculations of Z';

determining, by the service provider server, whether the first discrete exponential function Z is equal to the second discrete exponential function Z'; and responsive to determining that the first discrete exponential function Z is equal to the second discrete exponential function Z', granting the user device access to the one or more online services provided by the service provider server.

2. The method of claim 1, wherein the first discrete exponential function Z is computed as:

$$Z = h_{n-x}(y) \cdot Q$$

wherein n is order of hash, x is a predefined number, and n is decremented by x with each subsequent calculation of Z.

3. The method of claim 1, wherein the second discrete exponential function Z' is computed as:

$$Z' = h_{n-x}(y) \cdot Q$$

wherein n is order of hash, x is a predefined number, and n is decremented by x with each subsequent calculation of Z'.

4. The method of claim 1, wherein the element Q is an element from a cyclic group G of generator P.

5. The method of claim 1, further comprising:

generating the first random number r;

encrypting the first random number r and the element Q with a user password;

sending the encrypted first random number r and the element Q;

decrypting, by the user device, the encrypted first number r and the element Q; and generating, by the user device, hash of the first random number r.

6. A computer implemented method executed by one or more computing devices for securely giving access for one or more online services hosted by a service provider server to a user device, the method comprising:

sending a service provider password from the service provider server to an authentication server;

receiving at the service provider server, from the authentication server, a random number y, a user id, and an element Q, wherein the random number y, the user id, and the element Q are encrypted with the service provider password;

decrypting the received random number y, user id, and element Q at the service provider server using the service provider password;

storing the decrypted user id in association with the decrypted element Q and the decrypted random number y at the service provider server;

receiving, at the service provider server, from the user device, the user id and a computed first discrete exponential function Z, wherein Z is computed at the user device using the element Q and the random number y received by the user device from the authentication server, wherein the first discrete exponential function Z is computed as:

$$Z = h_n(y) \cdot Q$$

wherein n is order of hash;

responsive to the receiving of the user id and the first discrete exponential function from the user device, looking up the element Q and the random number y at the service provider server;

computing, by the service provider server, a second discrete exponential function Z, using the element Q and the random number y associated with the user id;

determining, by the service provider server, whether the first discrete exponential function Z received from the user device is equal to the second discrete exponential function Z' computed by the service provider server, wherein the second discrete exponential function Z' is computed as:

$$Z' = h_n(y) \cdot Q$$

wherein n is order of hash; and responsive to determining that the first discrete exponential function Z received from the user device is equal to the second discrete exponential function Z' computed by the service provider server, granting the user device access to the one or more online services hosted by the service provider server.

7. The method of claim 6, wherein the first discrete exponential function Z is computed as:

$$Z = h_{n-x}(y) \cdot Q$$

wherein n is order of hash, x is a predefined number, and n is decremented by x with each subsequent calculation of Z.

8. The method of claim 6, wherein the second discrete exponential function Z' is computed as:

$$Z' = h_{n-x}(y) \cdot Q$$

wherein n is order of hash, x is a predefined number, and n is decremented by x with each subsequent calculation of Z'.

9. The method of claim 6, wherein the element Q is an element from a cyclic group G of generator P.

10. A system securely accessing different online services based on a single sign on, the system comprising:

a user computing device configured to:
send a service request to an authentication server via a data network for access to an online service hosted by a service provider server which a user wants to access, the service request comprising a user id and a hash of a first random number r,
receive, via the data network, a second random number y from the authentication server, wherein the second random number y is encrypted with the first random number r;
decrypt the received second random number y using the first random number r;
compute a first discrete exponential function Z using an element Q and the second random number y received from the authentication server, wherein the first discrete exponential function Z is computed as:

$$Z = h_n(y) \cdot Q$$

wherein n is decremented with each subsequent calculation of Z, and
send the user id and the computed first discrete exponential function Z to the service provider server via the data network;

the authentication server configured to:
receive the service request comprising the hash of the first random number r, and the user id, from the user computing device via the data network,
retrieve the first random number r from a database and compute a second hash of a first random number r,
determine whether the hash of the first random number r received from the user computing device is equal to the second hash of the first random number r,
authenticate the user computing device responsive to determining that the second hash of the first random number r is equal to the hash of the first random number r received from the user computing device,
retrieve the second random number y from the database,
encrypt the second random number y with the first random number r,
send the second random number y encrypted with the first random number r to the user computing device via the data network,
encrypt the second random number y, the user id, and the element Q using a service provider password received from the service provider server via the data network, and
send the second random number y, the user id, and the element Q encrypted with the service provider password to the service provider server via the data network;

the database configured to:
store the first random number r, the second random number y, and the service provider password; and the service provider server configured to:
retrieve the service provider password from the database and send the service provider password to the authentication server via the data network,
receive the second random number y, the user id, and the element Q encrypted with the service provider password from the authentication server via the data network,
decrypt the second random number y, the user id, and the element Q using the service provider password,
compute a second discrete exponential function Z' using the element Q and the second random number y, wherein the second discrete exponential function Z' is computed as:

$$Z' = h_n(y) \cdot Q$$

wherein n is decremented with each subsequent calculation of Z',
receive the user id and the first discrete exponential function Z from the user computing device via the data network,
determine whether the first discrete exponential function Z received from the user computing device is equal to the second discrete exponential function Z', and
grant the user computing device access to the online service hosted by the service provider server responsive to determining that the first discrete exponential function Z received from the user computing device is equal to the second discrete exponential function Z' computed by the service provider server.

11. The system of claim 10, wherein the first discrete exponential function Z is computed as:

$$Z = h_{n-x}(y) \cdot Q$$

wherein n is order of hash, x is a predefined number, and n is decremented by x with each subsequent calculation of Z.

12. The system of claim 10, wherein the second discrete exponential function Z' is computed as:

$$Z' = h_{n-x}(y) \cdot Q$$

wherein n is order of hash, x is a predefined number, and n is decremented by x with each subsequent calculation of Z'.

13. The system of claim 10, wherein the element Q is an element from a cyclic group G of generator P.

14. An authentication system comprising:
a memory;
one or more processors, at least one of which is operatively coupled to the memory, the one or more processors configured to perform the steps of:
computing, by an authentication server, a first hash of a first random number r and storing the first hash of the random number r in the memory;
receiving, by the authentication server, a second hash of the first random number r from a user device;
retrieving, by the authentication server, the computed first hash of the first random number r from the memory;
authenticating the user device by the authentication server, provided the computed first hash of the first random number r is same as the received second hash of the first random number r;
encrypting, by the authentication server, a second random number y with the first random number r;
sending the second random number y encrypted with the first random number r from the authentication server to the user device;
retrieving, by the authentication server, a service provider password, provided by a service provider server, from the memory;
encrypting, by the authentication server, the second random number y, a user id and an element Q using the service provider password;
sending the second random number y, the user id and the element Q encrypted with the service provider password from the authentication server to the service provider server;
computing, by the user device, a first discrete exponential function Z using the element Q and the second random number y, wherein the first discrete exponential function Z is computed as:

$$Z = h_n(y) \cdot Q$$

wherein n is order of hash and n is decremented by a predefined number with each subsequent calculation of Z;
sending, by the user device, the user id and the computed first discrete exponential function Z to the service provider server;
computing, by the service provider server, a second discrete exponential function Z', using the element Q and the second random number y, wherein the second discrete exponential function Z' is computed as:

$$Z' = h_n(y) \cdot Q$$

wherein n is order of hash and n is decremented by a predefined number with each subsequent calculation of Z';
determining, by the service provider server, whether the first discrete exponential function Z received from the user device is equal to the second discrete exponential function Z'; and
responsive to determining that the first discrete exponential function Z received from the user device is equal to the second discrete exponential function Z', granting the user device access to one or more online services provided by the service provider server.

15. The authentication server of claim 14, wherein the element Q is an element from a cyclic group G of generator P.

* * * * *